United States Patent
Alidedeoglu et al.

(10) Patent No.: US 9,828,461 B2
(45) Date of Patent: Nov. 28, 2017

(54) POLY(ALKYLENE CO-ADIPATE TEREPHTHALATE) PREPARED FROM RECYCLED POLYETHYLENE TEREPHTHALATE HAVING LOW IMPURITY LEVELS

(71) Applicant: SABIC INNOVATIVE PLASTICS

(72) Inventors: Husnu Alp Alidedeoglu, Evansville, IN (US); Ganesh Kannan, Evansville, IN (US)

(73) Assignee: SABIC Global Technologies B.V., Pittsfield, MA (US)

( * ) Notice: Subject to any disclaimer, the term of this patent is extended or adjusted under 35 U.S.C. 154(b) by 0 days.

(21) Appl. No.: 14/170,125

(22) Filed: Jan. 31, 2014

(65) Prior Publication Data
US 2014/0148514 A1 May 29, 2014

Related U.S. Application Data

(63) Continuation-in-part of application No. 13/409,898, filed on Mar. 1, 2012, now Pat. No. 9,034,983.

(51) Int. Cl.
| | |
|---|---|
| C08G 63/60 | (2006.01) |
| D06P 1/52 | (2006.01) |
| C08K 5/00 | (2006.01) |
| C08K 11/00 | (2006.01) |
| C08G 63/48 | (2006.01) |
| C08G 63/91 | (2006.01) |
| C08L 51/00 | (2006.01) |
| C08C 19/24 | (2006.01) |
| C08F 8/40 | (2006.01) |
| C08G 63/16 | (2006.01) |
| C08G 63/78 | (2006.01) |

(52) U.S. Cl.
CPC ............ *C08G 63/16* (2013.01); *C08G 63/78* (2013.01)

(58) Field of Classification Search
None
See application file for complete search history.

(56) References Cited

U.S. PATENT DOCUMENTS

| | | |
|---|---|---|
| 2,012,267 A | 8/1935 | Carothers et al. |
| 3,951,886 A | 4/1976 | Miyake et al. |
| 4,328,059 A | 5/1982 | Horlbeck et al. |
| 5,008,366 A | 4/1991 | Bathe et al. |
| 5,266,601 A | 11/1993 | Kyber et al. |
| 5,378,796 A | 1/1995 | George et al. |
| 5,451,611 A | 9/1995 | Chilukuri et al. |
| 5,453,479 A | 9/1995 | Borman et al. |
| 5,869,543 A | 2/1999 | Boos et al. |
| 6,120,895 A | 9/2000 | Kowitz et al. |
| 6,303,738 B1 | 10/2001 | Putzig et al. |
| 6,472,557 B1 | 10/2002 | Pell et al. |
| 6,518,322 B1 | 2/2003 | West et al. |
| 6,803,389 B2 | 10/2004 | Kawamura et al. |
| 6,998,462 B2 | 2/2006 | Duan et al. |
| 7,166,690 B2 | 1/2007 | Kim et al. |
| 7,799,836 B2 | 9/2010 | Agarwal et al. |
| 7,799,892 B2 | 9/2010 | Ravi et al. |
| 7,902,263 B2 | 3/2011 | Agarwal et al. |
| 8,088,834 B2 | 1/2012 | Agarwal et al. |
| 2003/0187149 A1 | 10/2003 | Schmidt et al. |
| 2005/0113534 A1 | 5/2005 | Agarwal et al. |
| 2005/0182196 A1 | 8/2005 | Khemani et al. |
| 2007/0203283 A1 | 8/2007 | Scheer et al. |
| 2007/0240075 A1* | 10/2007 | Jesberger ................ B32B 27/36 715/772 |
| 2008/0153940 A1 | 6/2008 | Scheer et al. |
| 2010/0003457 A1 | 1/2010 | Ettridge et al. |
| 2010/0181372 A1 | 7/2010 | Huang et al. |
| 2011/0071235 A1 | 3/2011 | Kannan et al. |
| 2013/0231420 A1 | 9/2013 | Alidedeoglu et al. |

FOREIGN PATENT DOCUMENTS

| | | |
|---|---|---|
| DE | 19638488 | 3/1998 |
| EP | 1473324 | 3/2004 |
| EP | 1725614 | 8/2008 |
| JP | 2005089572 | 4/2005 |
| JP | 2005350530 | 12/2005 |
| WO | WO 9527753 | 10/1995 |

(Continued)

OTHER PUBLICATIONS

Chang, Shinn-Jen, Tsai, Hong-Bing, Journal of Applied Polymer Science, vol. 51, pp. 999-1004 (1994) "Copolyesters. VII. Thermal Transitions of Poly (butylene terephthalate-co-isophthalate-co-adipate)s".
Witt, U., et al., Journal of Environmental Polymer Degradation, vol. 3, No. 4 (1995), "New Biodegradable Polyester-Copolymers from Commodity Chemicals with Favorable Use Properties 1".
Matsuda, H., Asakura, T., et al., Macromolecules 2004, 37, 4651-4657, "Relationship between Sequence Distribution and Thermal Properties of the Transesterification Product between Poly(ethylene terephthalate) and Poly (butylene terephthalate)".

(Continued)

*Primary Examiner* — Robert T Butcher
(74) *Attorney, Agent, or Firm* — Honigman Miller Schwartz and Cohn LLP; Heidi M. Berven

(57) ABSTRACT

This disclosure relates to an aliphatic-aromatic copolyester of poly(butylene-co-adipate terephthalate) that is prepared from recycled polyethylene terephthalate in the presence of titanium catalyst and a phosphorous containing compound. The copolyester is contaminated with little or no ethylene glycol and/or isophthalic acid, which are artifacts of preparing the copolyester from recycled PET. Advantageously, because there is little or no contamination from ethylene glycol and/or isophthalic acid in the copolyester, there is essentially no depression in the material's melting temperature.

6 Claims, 2 Drawing Sheets

(56) References Cited

FOREIGN PATENT DOCUMENTS

| WO | WO 2005085350 | 9/2005 |
|----|---------------|--------|
| WO | WO 2008042384 | 4/2008 |
| WO | WO 2008085396 | 7/2008 |
| WO | 2009127556 | 10/2009 |
| WO | 2011054786 | 5/2011 |

OTHER PUBLICATIONS

Karayannidis, G. P, et al., Journal of Applied Polymer Science, vol. 78, 200-207 (2000), "Thermal Behavior and Tensile Propeties of Poly(ethylene terephathalate-co-ethylene isophthalate)".
International Search Report of PCT/US2012/071904, dated Jun. 24, 2013.

* cited by examiner

POLY(ALKYLENE CO-ADIPATE TEREPHTHALATE) PREPARED FROM RECYCLED POLYETHYLENE TEREPHTHALATE HAVING LOW IMPURITY LEVELS

CLAIM OF PRIORITY

This application is a continuation-in-part of U.S. application Ser. No. 13/409,898, filed Mar. 1, 2012, the entire contents of which is incorporated herein in its entirety.

TECHNICAL FIELD OF THE INVENTION

This disclosure relates to an aliphatic-aromatic copolyester of poly(butylene-co-adipate terephthalate) that is prepared from recycled polyethylene terephthalate in the presence of a titanium catalyst and a phosphorous containing compound. The copolyester is contaminated with little or no ethylene glycol and/or isophthalic acid, which are artifacts of preparing the copolyester from recycled PET. Advantageously, because there is little or no contamination from ethylene glycol and/or isophthalic acid in the copolyester, there is essentially no depression in the material's melting temperature.

BACKGROUND OF THE INVENTION

Thermoplastic molding compositions based on poly(butylene terephthalate) (PBT) are used in various applications. However, PBT molding compositions generally cannot be made from recycled sources of PBT due to the lack of availability of large post-consumer or post-industrial supplies of PBT scrap materials. Polyethylene terephthalate (PET), unlike PBT, is made in much larger quantities and is more easily recovered from consumer wastes.

With increasing demand for conserving non-renewable resources and more effectively recycling underutilized scrap PET, improved and less costly processes for deriving PBT from scrap PET materials are sought, in particular if the resulting derived PBT compositions possess desirable physical properties such as tensile and impact strength, and thermal properties. To that end, the preparation of polybutylene-co-adipate terephthalate (PBAT) copolyester prepared using post-consumer (recycled) poly(ethylene terephthalate) (PET) has been disclosed. The resulting copolyester contains the impurities ethylene glycol (EG), and isophthalic acid in the backbone, both artifacts from using post-consumer (recycled) PET during the depolymerization process. Such impurities have a negative effect on the melting temperature of the resulting copolymer, making the material less suitable for commercial use. As a result, it is desirable to provide PBAT grades prepared from recycled PET that have reduced concentrations of EG and isophthalic acid.

SUMMARY OF THE INVENTION

These and other needs are met by the present invention which is directed to PBAT grades prepared from recycled PET that have reduced concentrations of EG and/or isophthalic acid. The resulting PBAT grades do not have depressed melting points, making them more desirable for a variety of commercial uses.

In one aspect, the invention is directed to a method for the manufacture of a poly(butylene terephthalate-co-adipate) copolymer, the method comprising:

(a) polymerizing 1,4-butanediol and an acid component comprising, based on the total weight of the-acid component,
  1) from 20 to 95 mol % of an adipic acid component selected from adipic acid, an ester-forming derivative of adipic acid, and combinations thereof, and
  2) from 5 to 80 mol % of an aromatic dicarboxy compound selected from an aromatic dicarboxylic acid, aromatic dicarboxylic ($C_{1-3}$)alkyl ester derived from polyethylene terephthalate, or a combination thereof, and a polyester component residue derived from a terephthalic-containing polyester homopolymer, a terephthalic-containing polyester copolymer, and combinations thereof; in the presence of a catalyst under conditions effective to form poly(butylene terephthalate-co-adipate) oligomers;

(b) adding a quencher, selected from a phosphorus-containing compound, a nitrogen containing compound, a boron-containing compound, and combinations thereof to form the poly(butylene terephthalate-co-adipate) copolymer;

wherein the copolymer comprises 5 weight percent or less of ethylene glycol and 3 weight percent of less or isophthalic acid in the backbone and has a melt temperature of 100 to 125° C.

In another aspect, the invention is directed to a method for the manufacture of a poly(butylene terephthalate-co-adipate) copolymer, the method comprising:

(a) polymerizing 1,4-butanediol and an acid component comprising, based on the total weight of the-acid component,
  1) from 20 to 95 mol % of an adipic acid component selected from adipic acid, an ester-forming derivative of adipic acid, and combinations thereof, and
  2) from 5 to 80 mol % of an aromatic dicarboxy compound selected from an aromatic dicarboxylic acid, aromatic dicarboxylic ($C_{1-3}$)alkyl ester derived from polyethylene terephthalate, or a combination thereof, and a polyester component residue derived from a terephthalic-containing polyester homopolymer, a terephthalic-containing polyester copolymer, and combinations thereof; in the presence of a catalyst and a quencher under conditions effective to form poly(butylene terephthalate-co-adipate) oligomers;

wherein the quencher is selected from a phosphorus-containing compound, a nitrogen containing compound, a boron-containing compound, and combinations thereof, to form the poly(butylene terephthalate-co-adipate) copolymer; and wherein the copolymer comprises 5 weight percent or less of ethylene glycol and 3 weight percent of less or isophthalic acid in the backbone and has a melt temperature of 100 to 125° C.

In another aspect, the invention is directed to a method for the manufacture of a poly(butylene terephthalate-co-adipate) copolymer, the method comprising:

in the presence of a catalyst and a quencher, polymerizing 1,4-butanediol and an acid component comprising, based on the total weight of the-acid component,
  1) from 20 to 95 mol % of an adipic acid component selected from adipic acid, an ester-forming derivative of adipic acid, and combinations thereof, and
  2) from 5 to 80 mol % of an aromatic dicarboxy compound selected from an aromatic dicarboxylic acid, aromatic dicarboxylic ($C_{1-3}$)alkyl ester derived from polyethylene terephthalate, or a combination thereof, and a polyester component residue derived from a terephthalic-containing polyester homopolymer, a terephthalic-containing polyester copolymer, and combinations thereof;

wherein the copolymer comprises 5 weight percent or less of ethylene glycol and 3 weight percent of less or isophthalic acid in the backbone and has a melt temperature of 100 to 125° C.

DETAILED DESCRIPTION OF THE INVENTION

Figure 1:
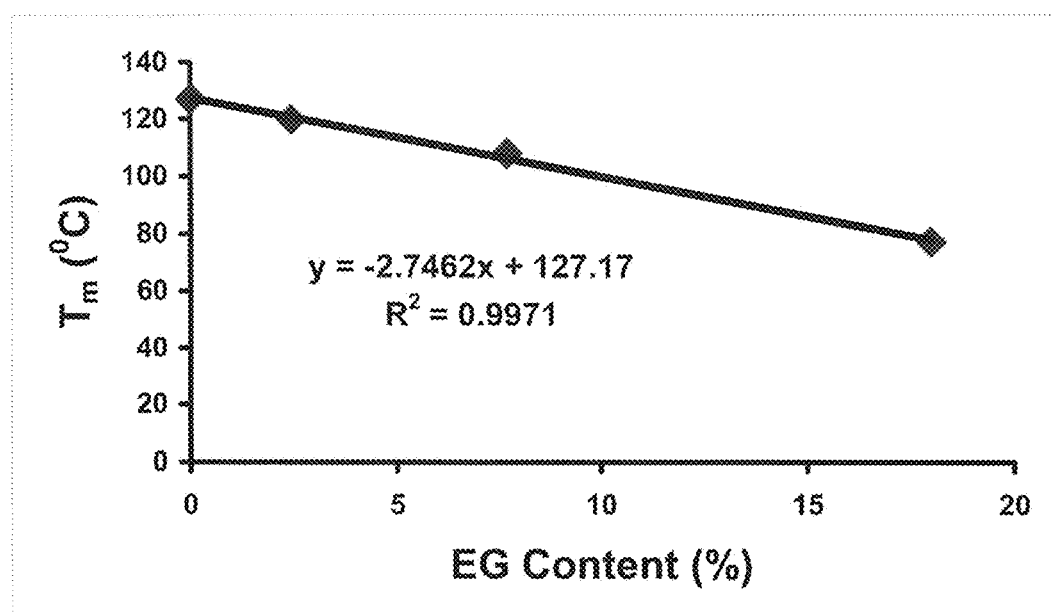
FIG. 1 depicts the effect of the amount of EG (in the backbone of the copolymer) on the melting temperature of PBAT copolyester.

The term "recycle" as used herein refers to any component that has been manufactured and either used or intended for scrap. Thus, a recycle polyester can be polyester that has been used, for example in a drinking bottle, or that is a byproduct of a manufacturing process, for example that does not meet a required specification and therefore would otherwise be discarded or scrapped. Recycle materials can therefore contain virgin materials that have not been utilized. Generally, in the case of PET, the PET includes recycle (scrap) PET in flake, powder/chip, film, or pellet form. Before use, the PET is generally processed to remove any impurities such as paper, adhesives, polyolefin, e.g., polypropylene, polyvinyl chloride (PVC), nylon, polylactic acid (an aliphatic polyester), and other contaminants.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. "Or" means "and/or." Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid which has the formula (—O(CO)C$_6$H$_4$(CO)—), the term "terephthalic acid group" means the group or residue of isophthalic acid having the formula (—O(CO)C$_6$H$_4$(CO)—, the term "diethylene glycol group" means the group or residue of diethylene glycol having the formula (—O(C$_2$H$_4$)O(C$_2$H$_4$)—), the term "butanediol group" means the group or residue of butanediol having the formula (—O(C$_4$H$_8$)—), and the term "ethylene glycol group" means the group or residue of ethylene glycol having the formula (—O(C$_2$H$_4$)—).

Any of the 1,4-butane diol, the adipic acid, or any other component of the copolyesters can be derived from a biological source. In an embodiment all or a portion of the 1,4-butane diol is derived from a biological source. "Bio-derived diols" as used herein refers to alcohols other than those named and derived from a biological source, e.g., various pentoses, hexoses, and the like.

The poly(butylene-co-adipate terephthalate) copolymers described herein comprise adipic acid groups, 1,4-butane diol groups, and aromatic dicarboxylic acid groups derived from a poly(ethylene terephthalate) component, i.e., a poly (ethylene terephthalate) homopolymer, a poly(ethylene terephthalate) copolymer, or a combination thereof. The aromatic dicarboxylic groups can be dicarboxylic ester groups. The dicarboxylic ester groups comprise the polymerization product of, for instance terephthalic acid or dimethyl terephthalate derived from recycled PET and the dihydric alcohol (1,4-butanediol). The copolyester further comprises a dimethyl terephthalate residual composition. Processes for recovering dimethyl terephthalate, also referred to as DMT or the dimethyl ester of terephthalic acid from PET, are known in the art, for example as set forth in U.S. Pat. No. 6,472,557 and other patents disclosed therein. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate (DMT).

The copolyesters can further comprise other residues present in the poly(ethylene terephthalate) component, including catalyst residues from the manufacture of the poly(ethylene terephthalate) component, residues from additives in the poly(ethylene terephthalate) component, or residues arising from side reactions that occur during recovery of the DMT from the poly(ethylene terephthalate) component and/or the reaction of the first dihydric alcohol, the aliphatic diacid, and the DMT component. For example, in addition to butane diol groups, dihydric alcohol groups incorporated into the copolyester can be derived from any dihydric alcohol that reacts with the adipic acid and the DMT used to form the copolyester, such as groups derived from ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. Such groups can arise, for example from a polyethylene terephthalate component containing polyethylene terephthalate copolymers.

Residues derived from the poly(ethylene terephthalate) component can be ethylene glycol groups, diethylene glycol groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In an embodiment, the residue derived from the poly(ethylene terephthalate) component comprises ethylene glycol groups, diethylene glycol groups, and more particularly a combination of ethylene glycol groups, diethylene glycol groups.

Process for Preparing Copolyesters

The preparation of copolyesters is well known in the art, such as disclosed in U.S. Pat. No. 2,012,267. Such reactions are typically operated at temperatures from 150 to 300° C. in the presence of polycondensation catalysts such as tetraisopropyl titanate, manganese diacetate, antimony oxide, dibutyl tin diacetate, zinc chloride, or combinations thereof. The amount of catalyst to obtain an acceptable depolymerization/oligomerization rate at the desired temperatures will vary, and can be determined by experimentation. The catalysts are typically employed in amounts from 10 to 5000, or 10 to 1000 parts per million (ppm), based on total weight of the reactants. In an embodiment, the catalyst is a tetraisopropyl titanate (TPT), available from DuPont under the tradename TYZOR.

The reaction also includes a quencher. The quencher may be a phosphorus-containing compound, a nitrogen-containing compound or a boron-containing compound, or a combination thereof.

Phosphorus-containing compounds include phosphoric acid, poly(phosphoric acid), phosphorous acid, monobutyl phosphate, dibutyl phosphate, monoalkyl phosphates, dialkyl phosphates, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

Generally, the quencher is selected from phosphoric acid, phosphorous acid, boric acid, and combinations thereof. In an embodiment of the method, the quencher is added at from 0.05 to 1 mole % based upon total moles of poly(butylene terephthalate-co-adipate) copolymer. In an embodiment, the copolymer contains 0.05 to 1 mol % of the quencher residue, based on poly(butylene terephthalate-co-adipate) copolymer.

In an embodiment, the catalyst is selected from tetraisopropyl titanate (TPT), manganese diacetate, antimony oxide, dibutyl tin diacetate, and zinc chloride, or combinations thereof and the quencher is selected from phosphorus-containing compounds selected from phosphoric acid, poly(phosphoric acid), phosphorous acid, monobutyl phosphate, dibutyl phosphate, monoalkyl phosphates, and dialkyl phosphates, or combinations thereof. More particularly, the catalyst is TPT and the phosphorous containing compound is phosphoric acid.

The TPT catalyst and quencher are typically added sequentially in the method. Thus, TPT can be added, then phosphoric acid. Or, phosphoric acid can be added, then TPT. For example, in one embodiment, butane diol and phosphoric acid in water are combined, then TPT is added, followed by adipic acid and additional butane diol as needed. In another embodiment, butane diol and adipic acid are combined, then TPT is added, followed by terephthalic acid or dimethyl terephthalate, butane diol as needed, and then phosphoric acid.

The poly(butylene terephthalate-co-adipate) copolymers have an advantageous combination of properties. For example, the copolymers can have a melt temperature of 100 to 125° C., 110 to 125° C., 100 to 120° C., 100 to 115° C., or 100 to 110° C.

In addition, the copolymers can have an I.V. of greater than 1.0, greater than 1.2, greater than 1.5 deciliter per minute (dL/minute) as measured in a 60:40 by weight phenol/1,1,2,2-tetrachloroethane mixture at 23° C.

The composition of the invention includes, in addition to the copolyester, other components combined with the copolyester, for example other polymers and additives, used in the formulation of molding compositions. Examples of the polymers include aliphatic polyesters, aromatic polycarbonates, aliphatic polycarbonates, starches, aromatic polyesters, cycloaliphatic polyesters, polyesteramides, combinations thereof and the like. The polymers can be wholly or partially bio-derived, including petroleum-derived aromatic polyesters and bio-derived aromatic polyesters. In the art, chain extenders such as epoxides, bisoxazolines, biscaprolactams, dianhydrides, and the like have been reported for use in polyesters. Among these, epoxides are most widely used on a commercial scale due to their relatively low cost and availability of a variety of structures.

In a specific embodiment the copolyester is combined with an aliphatic polyester, for example poly(lactic acid), poly(hydroxyalkanoate), poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt. % and the amount of polylactic acid can range from 10 to 60 wt. %, specifically 40 to 60%, based on the total weight of the composition.

The composition can also contain from 0.01 to 45 wt. %, based on the total weight of the composition, of an additive selected from alcohols, acetates, alcohol-acetate copolymers, and combinations thereof. Additionally, the composition can contain from 0.01 to 2 wt. %, based on the weight of the composition, of an additive selected from cross-linkers, anti-aging agents, retrogradation agents, anti-blocking agents, water, odor-controlling agents, and combinations thereof.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, antioxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In an embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, extrusion molded, blow molded, solvent cast or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

Reducing Ethylene Glycol and Isophthalic Acid Contamination

When the copolyester is PBAT, undesirable impurities such as EG and isophthalic acid may be incorporated into the copolyester backbone. The presence of these impurities in the backbone of PBAT prepared using the recycling process of post-consumer poly(ethylene terephthalate) (PET) leads to a depression in the melting point of the material as compared to PBAT made from virgin PBT.

Since the goal is to provide a PBAT from recycled components that performs comparably to PBAT made from virgin PBT, it is important to control the concentration of EG and isophthalic acid contaminants in the copolyester backbone so that a melting point depression to below 100° C. is not observed. To that end, to maintain the melting temperature we have found that no more than 5 weight percent of EG and no more than 3 weight percent isophthalic acid can be present in the backbone of the PBAT copolyester.

In one embodiment, the method described herein comprises:

under conditions effective to form poly(butylene terephthalate-co-adipate) oligomers and in the presence of tetraisopropyl titanate and phosphoric acid, polymerizing 1,4-butanediol and an acid component comprising, based on the total weight of the-acid component, 1) from 20 to 95 mol % of an adipic acid component selected from adipic acid, an ester-forming derivative of adipic acid, and combinations thereof, and 2) from 5 to 80 mol % of an aromatic dicarboxy compound selected from an aromatic dicarboxylic acid, aromatic dicarboxylic $(C_{1-3})$alkyl ester derived from polyethylene terephthalate, or a combination thereof, and a polyester component residue derived from a terephthalic-containing polyester homopolymer, a terephthalic-containing polyester copolymer, and combinations thereof;

wherein the copolymer comprises 5 weight percent or less of ethylene glycol and 3 weight percent of less or isophthalic acid in the backbone and has a melt temperature of 100 to 125° C.

In a typical procedure, PBAT was synthesized in the presence of TPT and phosphoric acid in 1:1 molar ratio. First, 1,4-butanediol (BDO), and phosphoric acid solution in water (0.1 g/mL) are combined and heated to a temperature of 175° C. After 20 minutes, TPT is added and an in-situ complexation between phosphoric acid and TPT is carried for 40 minutes under $N_2$ atmosphere. Then, terephthalic acid, ADA and additional BDO are introduced into the catalyst solution and the temperature is increased to 220° C. while stirring under nitrogen until the clear point was observed. The temperature of the reaction mixture is increased to 250° C. and the vacuum is adjusted to below 1 torr. The polymerization is stopped after achieving desired intrinsic viscosity. The PBAT prepared as described herein preferably has a melting temperature of greater than 100° C. and contains (i) no more than 5 weight percent of EG; and (ii) no more than 3 weight percent of isophthalic acid.

More preferably, the PBAT prepared as described herein has a melting temperature of greater than 100° C. and contains (i) no more than 3 weight percent of EG; and (ii) no more than 2 weight percent of isophthalic acid.

More preferably, the PBAT prepared as described herein has a melting temperature of greater than 100° C. and contains (i) no more than 2 weight percent of EG; and (ii) no more than 1 weight percent of isophthalic acid.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. In the following illustrative examples, all parts and percentages are by weight unless otherwise indicated.

TABLE 1

| Component | Trade Name and Supplier |
| --- | --- |
| BDO | 1,4-Butanediol, CAS Reg. No. 110-6304, from BASF. |
| PA | Phosphoric Acid CAS Reg. No. 7664-38-2, from Acros. |
| TPT | Tetraisopropyl titanate, CAS Reg. No. 546-68-9, from DuPont, commercial Tyzor grade |
| EG | Ethylene Glycol CAS Reg. No. 107-21-1 |
|  | Isophthalic Acid, CAS Reg. No. 121-91-5 |
|  | Terephthlatic Acid, 100-21-0 |
| ADA | Adipic Acid CAS Reg. No. 124-04-9 |

Example 1

The effect of EG on the melting temperature of PBAT prepared using TPT and phosphoric acid in a 1:1 mol ratio was investigated. First, 50 g of 1,4-butanediol BDO, 0.5 ml of phosphoric acid solution in water (0.1 g/ml) were introduced into a three neck round bottom flask. The reactor was placed in an oil bath heated to a temperature of 175° C. After 20 minutes, 250 ppm of TPT was added to the reactor and an in-situ complexation between phosphoric acid and TPT was carried for 40 minutes under $N_2$ atmosphere. Then, 41.5 g of terephthalic acid, 36.5 g of ADA and 60 g of additional BDO and EG (from 0 g to 60 g) were introduced into the catalyst solution and the ester interchange temperature was increased to 220° C. with a rate of 2° C./min while stirring at 260 rpm under nitrogen. The ester interchange stage was carried until the clear point was observed. The temperature of the reaction mixture was increased to 250° C. and the polymerization stage was initiated with the vacuum adjusted to below 1 torr. The polymerization was stopped after achieving desired intrinsic viscosity. The resulting polymers exhibited white color. The effect of the EG amount on the melting temperature of the copolymer is given in FIG. 1. It can be seen that to achieve a melting point of 100° C. or higher, it is necessary to minimize EG incorporation in the copolyester backbone, to less than 5 weight percent.

Example 2

Figure 2:
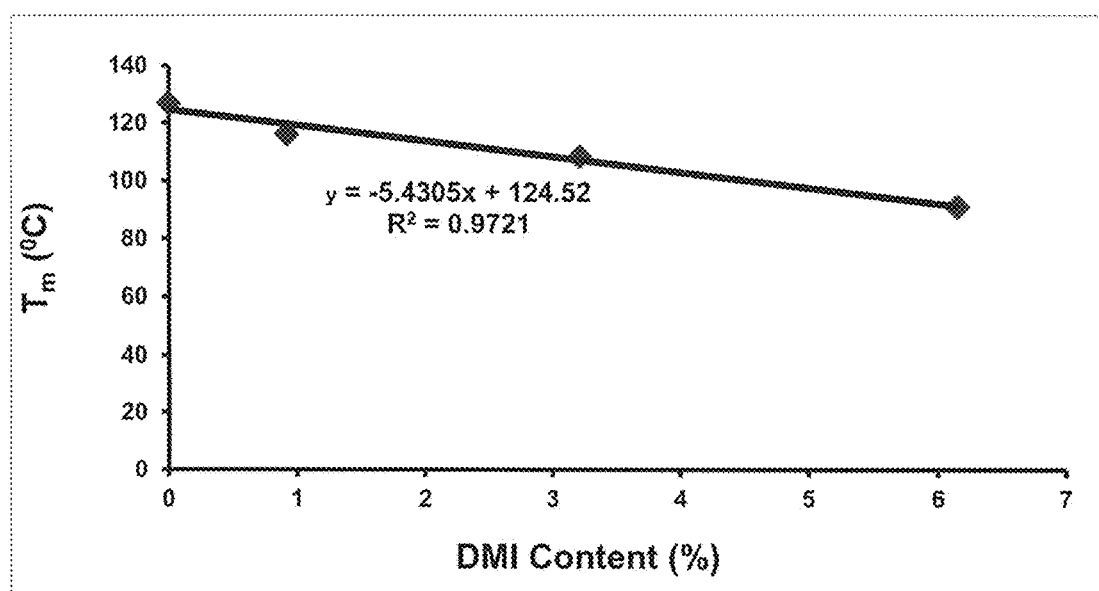
FIG. 2 depicts the effect of the amount of isophthalic acid (in the backbone of the copolymer) on the melting temperature of PBAT copolyester.

The effect of isophthalic acid on the melting temperature of PBAT prepared using TPT and phosphoric acid was investigated. PBAT was synthesized in the presence of TPT and phosphoric acid in 1:1 mol ratio. First, 50 g of 1,4-butanediol BDO, 0.5 ml of phosphoric acid solution in water (0.1 g/ml) were introduced into a three neck round bottom flask. The reactor was placed in an oil bath heated to a temperature of 175° C. After 20 minutes, 250 ppm of TPT was added to the reactor and an in-situ complexation between phosphoric acid and TPT was carried for 40 minutes under $N_2$ atmosphere. Then, 41.5 g of terephthalic acid, 36.5 g of ADA and 60 g of additional BDO and isophthalic acid (from 0 g to 12 g) were introduced into the catalyst solution and the ester interchange temperature was increased to 220° C. with a rate of 2° C./min while stirring at 260 rpm under nitrogen. The ester interchange stage was carried until the clear point was observed. The temperature of the reaction mixture was increased to 250° C. and the polymerization stage was initiated with the vacuum adjusted to below 1 torr. The polymerization was stopped after achieving desired intrinsic viscosity. The resulting polymers exhibited white color. The effect of the amount of isophthalic acid on the melting temperature of the copolymer is given in FIG. 2. It can be seen that to achieve a melting point of 100° C. or higher, it is necessary to minimize isophthalic acid incorporation in the copolyester backbone, to less than 3 weight percent.

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A poly(butylene terephthalate-co-adipate) copolymer comprising a polybutylene terephthalate residue, an adipic acid residue, and a tetraisopropyl titanate residue complexed to a phosphoric acid residue, wherein: the poly(butylene terephthalate-co-adipate) copolymer is prepared by the process of ester interchange and polymerization of 1,4-butane diol using:
   from 20 to 95 mol percent adipic acid, and
   from 5 to 80 mol percent of terephthalic acid or dimethyl terephthalate derived from polyethylene terephthalate and containing polyethylene terephthalate-derived ethylene glycol and polyethylene terephthalate-derived isophthalic acid; and
   0.05 to 1 mol percent of phosphoric acid based on poly(butylene terephthalate-co-adipate) copolymer and from 10 to 1000 ppm of tetraisoproyl titanate based on the total weight of the reactants, wherein the molar ratio of phosphoric acid to tetraisopropyl titanate is 1:1; and
   wherein the process comprises:
   the adipic acid and terephthalic acid or dimethyl terephthalate derived from polyethylene terephthalate are added to a solution of phosphoric acid and tetraisopropyl titanate in 1,4-butanediol that has been heated to 175° C.;

the solution of adipic acid, terephthalic acid or dimethyl terephthalate derived from polyethylene terephthalate, phosphoric acid, and tetraisopropyl titanate in 1,4-butanediol is heated to 220° C. for ester interchange;

the temperature of the solution of adipic acid, terephthalic acid or dimethyl terephthalate derived from polyethylene terephthalate, phosphoric acid, and tetraisopropyl titanate in 1,4-butanediol is then heated to 250° C. at a pressure of 1 Torr for polymerization until the clear point is reached; and wherein:

the poly(butylene terephthalate-co-adipate) copolymer comprising a polybutylene terephthalate residue, an adipic acid residue, and a tetraisopropyl titanate residue complexed to a phosphoric acid residue has a melt temperature of from 100 to 125° C. and an intrinsic viscosity of greater than 1.0 deciliter per minute as measured in a 60:40 by weight phenol/1,1,2,2-tetrachloroethane mixture at 23° C.; and the backbone of the poly(butylene terephthalate-co-adipate) copolymer consists of 5 weight percent or less of polyethylene terephthalate-derived ethylene glycol and 3 weight percent or less of polyethylene terephthalate-derived isophthalic acid in the backbone of the poly(butylene terephthalate-co-adipate) copolymer.

2. The poly(butylene terephthalate-co-adipate) copolymer of claim 1 consisting of less than 4 mole % of polyethylene terephthalate-derived ethylene glycol groups in the backbone.

3. The poly(butylene terephthalate-co-adipate) copolymer of claim 1 consisting of less than or equal to 2 mole % of polyethylene terephthalate-derived ethylene glycol groups and 3 weight percent or less of polyethylene terephthalate-derived isophthalate groups in the backbone.

4. The poly(butylene terephthalate-co-adipate) copolymer of claim 1 consisting of less than 10 mole % of a combination of polyethylene terephthalate-derived ethylene glycol groups and polyethylene terephthalate-derived isophthalate groups in the backbone.

5. A composition comprising the poly(butylene terephthalate-co-adipate) copolymer of claim 1 and at least one additive selected from the group consisting of a nucleating agent, an antioxidant, a UV stabilizer, a starch plasticizer, an epoxy compound, a melt strength additive, an alcohol, an acetate, an alcohol-acetate copolymer, a crosslinker, an anti-aging agent, a retrogradation agent, an anti-blocking agent, water, and an odor-controlling agent, or combinations thereof; and an additional thermoplastic polymer.

6. A poly(butylene terephthalate-co-adipate) copolymer having ethylene glycol and isophthalic acid in the backbone, wherein the poly(butylene terephthalate-co-adipate) copolymer consists of a polyester component residue, an adipic acid component residue, and a tetraisopropyl titanate residue complexed to a phosphoric acid residue, wherein: the poly(butylene terephthalate-co-adipate) copolymer is prepared by the process of ester interchange and polymerization of 1,4-butane diol and:

from 20 to 95 mol percent adipic acid, and from 5 to 80 mol percent of terephthalic acid or dimethyl terephthalate derived from polyethylene terephthalate and containing polyethylene terephthalate-derived ethylene glycol and polyethylene terephthalate-derived isophthalic acid; and 0.05 to 1 mol percent of phosphoric acid based on poly(butylene terephthalate-co-adipate) copolymer and from 10 to 1000 ppm of tetraisoproyl titanate based on the total weight of the reactants, wherein the molar ratio of phosphoric acid to tetraisopropyl titanate is 1:1; and wherein:

the adipic acid and terephthalic acid or dimethyl terephthalate derived from polyethylene terephthalate are added to a solution of phosphoric acid and tetraisopropyl titanate in 1,4-butanediol that has been heated to 175° C.;

the solution of adipic acid, terephthalic acid or dimethyl terephthalate derived from polyethylene terephthalate, phosphoric acid, and tetraisopropyl titanate in 1,4-butanediol is heated to 220° C. for ester interchange;

the temperature of the solution of adipic acid, terephthalic acid or dimethyl terephthalate derived from polyethylene terephthalate, phosphoric acid, and tetraisopropyl titanate in 1,4-butanediol is then heated to 250° C. at a pressure of 1 Torr for polymerization until the clear point is reached; and wherein:

the poly(butylene terephthalate-co-adipate) copolymer comprising a polybutylene terephthalate residue, an adipic acid residue, and a tetraisopropyl titanate residue complexed to a phosphoric acid residue has a melt temperature of from 100 to 125° C. and an intrinsic viscosity of greater than 1.0 deciliter per minute as measured in a 60:40 by weight phenol/1,1,2,2-tetrachloroethane mixture at 23° C.; and wherein:

the backbone of the poly(butylene terephthalate-co-adipate) copolymer consists of 5 weight percent or less of polyethylene terephthalate-derived ethylene glycol and 3 weight percent or less of polyethylene terephthalate-derived isophthalic acid in the backbone of the poly(butylene terephthalate-co-adipate) copolymer.

\* \* \* \* \*